US007544379B2

(12) United States Patent
Kawamura et al.

(10) Patent No.: US 7,544,379 B2
(45) Date of Patent: Jun. 9, 2009

(54) COMPOSITE CONTAINING FINE CELLULOSE

(75) Inventors: Yasushi Kawamura, Yokohama (JP); Yuka Itou, Asahi (JP); Nobuyoshi Mochihara, Nobeoka (JP); Yoshihito Yaginuma, Nobeoka (JP); Kouichi Noda, Nobeoka (JP); Akihiro Sakamoto, Nobeoka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 362 days.

(21) Appl. No.: 10/479,035

(22) PCT Filed: May 29, 2002

(86) PCT No.: PCT/JP02/05235

§ 371 (c)(1), (2), (4) Date: Nov. 26, 2003

(87) PCT Pub. No.: WO02/096213

PCT Pub. Date: Dec. 5, 2002

(65) Prior Publication Data

US 2004/0137138 A1 Jul. 15, 2004

(30) Foreign Application Priority Data

May 30, 2001 (JP) ............................ 2001-162317
Nov. 2, 2001 (JP) ............................ 2001-338310

(51) Int. Cl.
*A23L 1/05* (2006.01)
*A23L 1/0534* (2006.01)

(52) U.S. Cl. ...................................... 426/573; 426/658

(58) Field of Classification Search .................. 426/565
See application file for complete search history.

(56) References Cited

U.S. PATENT DOCUMENTS 5,415,804 A * 5/1995 Minami et al. ........... 252/363.5

FOREIGN PATENT DOCUMENTS

| | | | |
|---|---|---|---|
| EP | 0537554 | A2 | 4/1993 |
| EP | 0949294 | A1 | 10/1999 |
| EP | 1 048 690 | A1 | 11/2000 |
| JP | 39-20181 | B | 9/1964 |
| JP | 54-54169 | A | 4/1979 |
| JP | 54-55762 | A | 5/1979 |
| JP | 54-157875 | A | 12/1979 |
| JP | 55034006 | | 3/1982 |
| JP | 4-502409 | A | 5/1992 |
| JP | 4-507348 | A | 12/1992 |
| JP | 6-11793 | B2 | 2/1994 |
| JP | 11-299435 | A | 11/1999 |
| JP | 2000-69917 | A | 3/2000 |
| WO | WO 90/14017 | A | 11/1990 |
| WO | WO 91/02463 | A1 | 3/1991 |
| WO | WO-02/02643 | A1 | 10/2002 |

* cited by examiner

*Primary Examiner*—Jennifer McNeil
*Assistant Examiner*—Jyoti Chawla
(74) *Attorney, Agent, or Firm*—Birch, Stewart, Kolasch & Birch, LLP

(57) ABSTRACT

A fine-cellulose-containing complex comprising 60 to 80 wt % of fine cellulose, 2 to 12 wt % of locust bean gum, 0.5 to 8 wt % of xanthan gum and 0 to 37.5 wt % of a hydrophilic material(s), the complex being a powder wherein the average particle size of particles formed by mild dispersion of the complex in water at 85° C. is 60 μm or less, the proportion of particles with a particle size of 100 μm or more among the formed particles is 30 vol % or less based on the total volume of the formed particles, and a colloid fraction in the case of vigorous dispersion of the complex in water at 25° C. is 30% or less.

14 Claims, No Drawings

COMPOSITE CONTAINING FINE CELLULOSE

TECHNICAL FIELD

The present invention relates to complex powder containing fine cellulose for food. Furthermore, the present invention relates to food compositions such as ice cream type articles, low-caloric food, dietary fiber fortified food, and the like, which possess improved texture and stability.

BACKGROUND ART

Various additives are used in ice cream type articles in order to impart a smooth structure and a feel of body. Most of the additives are hydrophilic polysaccharides such as guar gum, locust bean gum, carageenan, pectin, etc. These additives, however, have a low solubility in the mouth and hence are liable to give a so-called pasty feel.

There are also cases where microcrystalline cellulose was added into ice cream type articles in order to impart a plain texture and heat shock resistance (a function of suppressing the growth of ice crystals caused by a temperature rise or drop during storage) (JP-A-54-54169, JP-A-54-55762 and JP-A-54-157875). Such techniques were used to impart a plain texture and heat shock resistance without deterioration of other performance characteristics by replacing a portion or the whole of a conventional additive (a hydrophilic polysaccharide) with a certain kind of microcrystalline cellulose complex.

The effect of the replacement, however, was not always sufficient.

That is, when a complex containing carageenan or xanthan gum is used in place of the above-mentioned hydrophilic polysaccharide, a relatively plain texture can be obtained. But when the complex is used in combination with the hydrophilic polysaccharide, a heavy texture is given. When guar gum or locust bean gum is blended, a stable suspension is formed, for example, by pre-dispersion with a mixer for home use for 3 minutes followed by one-pass dispersing treatment at a pressure of 24.52 MPa (250 kg/cm$^2$). However, in the case of treatment with a high-pressure homogenizer used for industrial production, the blending of guar gum or locust bean gum tends to cause blocking, so that the blending is disadvantageous in practice in the production of ice cream.

JP-A-4-502409 discloses that an aggregate comprising microcrystalline cellulose and galactomannan gum is effective as a non-nutritive fat-like bulking agent for food such as ice cream. This material is characterized in that when dispersed in water, it is not substantially disintegrated and retains the shape of dry powder particles, i.e., their spherical shape. This characteristic is the essence of the invention disclosed in the above reference. The above reference describes the following: for the modification of the surface of the aggregate comprising microcrystalline cellulose and galactomannan gum, xanthan gum or maltodextrin is blended to be adsorbed on the surface of the aggregate, whereby a function as a stabilizer in food is imparted to the aggregate and the taste is improved. Also in this case, the aggregate having the modified surface is not substantially disintegrated in water.

The above reference describes the fact that particularly when the gum (guar gum) content is approximately 1 to 15%, the spherical particles substantially retain their original shape before dispersion in water and have a higher shear resistance. The above reference also describes the case where the aggregate particles can be used after their forced conversion to a very fine fibrous material, only at a gum content of approximately 15 to 40% and under high-energy shearing (for example, treatment with a high-pressure homogenizer at a pressure of 41.37 MPa (422 kg/cm$^2$)) conditions. This fact means that the above-mentioned aggregate particles having a gum content of approximately 1 to 15% are not reduced in particle size even under such high-energy shearing conditions.

The above invention cannot solve the following existing problems. When the gum content is high, the aggregate particles give a pasty feel when incorporated into food, in particular, an ice cream type article, even if they are used in the form of either spherical particles or a fibrous material. On the other hand, when the gum content is low (20% or less), the particles are not finely dispersed, resulting in a decreased feel of body and a low heat shock resistance. There is also the following problem. When the size of the dry powder particles of the above invention is large, the dry powder particles are not reduced in particle size by pre-dispersion treatment. Therefore, when a piston type high-pressure homogenizer is used for the conventional production of an ice cream type article, stable homogenization of a liquid raw material for ice cream without pressure variation is difficult and blocking is caused in some cases.

Moreover, in recent years, the contribution of food to, for example, the suppression of excessive energy intake and the improvement of bowel and stomach conditions has been extensively investigated in order to prevent recent lifestyle-induced diseases such as diabetes, and various low-caloric or noncaloric foods and dietary fiber fortified foods have been developed. The point of the development has been that the changes of the appearance, state, texture and taste caused by enrichment with dietary fiber, in particular, water-insoluble dietary fiber which is said to be very effective as a substitute, are improved while reducing the blending amount of fat and oil, i.e., a main cause for energy, according to need. Many foods, however, have not been improved so as to be "delicious food low in calories and enriched with water-insoluble dietary fiber".

As cellulosic materials among materials for supplementing the body and texture of low fat food, i.e., so-called fat replacer, there is the material formerly disclosed in JP-B-39-20181 as well as the materials disclosed in JP-A-4-507348, JP-B-6-11793, etc. These materials are highly effective in improving the body, appearance and the like but cannot supplement "substance" due to oil.

DISCLOSURE OF THE INVENTION

The present invention is intended to provide a fine-cellulose-containing complex that permits production of ice cream type articles having a high solubility in the mouth, no rough feel and an excellent stability over a long period of time in spite of their feel of body, low-caloric foods having good substance and a high solubility in the mouth in spite of their low content of fat and oil, and foods containing dietary fiber which are excellent in controlling an effect on intestinal function.

In addition to pursuing the above object, the present invention is also intended to provide a fine-cellulose-containing complex that permits stable production of a liquid mix as a raw material for homogeneous ice cream type articles.

The present inventors have solved the above problems by the use of a water-dispersible fine-cellulose-containing complex having a specific composition, and have accomplished the present invention. That is, the present invention is as follows.

(1) A fine-cellulose-containing complex comprising 60 to 80 wt % of fine cellulose, 2 to 12 wt % of locust bean gum, 0.5 to 8 wt % of xanthan gum and 0 to 37.5 wt % of a hydrophilic material(s), said complex being a powder wherein the average particle size of particles formed by mild dispersion of the complex in water at 85° C. is 60 μm or less, the proportion of particles with a particle size of 100 μm or more among the formed particles is 30 vol % or less based on the total volume of the formed particles, and a colloid fraction in the case of vigorous dispersion of the complex in water at 25° C. is 30% or less.

(2) A fine-cellulose-containing complex according to (1), wherein the average particle size of particles formed by mild dispersion of the complex in water at 85° C. is 40 μm or less, and the proportion of particles with a particle size of 100 μm or more among the formed particles is 25 vol % or less based on the total volume of the formed particles.

(3) A fine-cellulose-containing complex according to (1) or (2), wherein the average particle size of particles formed by mild dispersion of the complex in water at 85° C. is 25 μm or less, and the proportion of particles with a particle size of 100 μm or more among the formed particles is 15 vol % or less based on the total volume of the formed particles.

(4) A food composition comprising a fine-cellulose-containing complex according to any one of (1) to (3) incorporated thereinto.

(5) A food composition according to (4), which is an ice cream type article.

(6) A process for producing a fine-cellulose-containing complex according to any one of (1) to (3) which comprises, at least, subjecting 60 to 80 wt % of fine cellulose, 2 to 12 wt % of locust bean gum, 0.5 to 8 wt % of xanthan gum and 0 to 37.5 wt % of the hydrophilic material(s) to wet co-grinding treatment in the presence of 20 to 60 wt % of water, and then drying.

BEST MODE FOR CARRYING OUT THE INVENTION

The present invention is explained below in detail.

The fine-cellulose-containing complex of the present invention contains 60 to 80 wt % of fine cellulose. When the proportion of the fine cellulose is less than 60 wt %, the feel of body of an ice cream type article obtained by the use of the complex becomes insufficient and its heat shock resistance is deteriorated. Needless to say, the content of water-insoluble dietary fiber in the ice cream type article is decreased, which is undesirable. In ice cream type articles, there is observed a heat shock, i.e., the following phenomenon: when a temperature rise or drop is caused during the storage of the ice cream type articles, ice crystals grow, resulting in a rough texture. The term "heat shock resistance" means a function of suppressing this growth of ice crystals, i.e., the same properties as "ice crystal growth preventing function". When the proportion of the fine cellulose is more than 80 wt %, the proportions of other components are decreased as much and hence the water-dispersibility of the complex is deteriorated, so that the dispersion of the complex by a strong shearing force becomes necessary. An especially preferable proportion of the fine cellulose is 65 to 75 wt %.

The locust bean gum used in the present invention is a polysaccharide obtained from seeds of carob belonging to Leguminosae and is a kind of galactomannan gum having D-mannose in the main chain and D-galactose in the side chain. The ratio of D-mannose to D-galactose is about 4:1. As the locust bean gum, either a purified-type or unpurified-type can be used, though the purified-type is preferable in view of the water-dispersibility.

Locust bean gum has been used as a thickening agent or stabilizer for food, is partly soluble in cold water and dissolves in warm water at 80° C. or higher. However, in general, it gives a pasty feel when incorporated into food. Particularly when locust bean gum is incorporated into an ice cream type article, it is effective in imparting a feel of body and heat shock resistance. However, it gives a pasty feel when used alone. The pasty feel cannot be sufficiently prevented even when locust bean gum is used in combination with a conventional microcrystalline cellulose preparation. In the present invention, locust bean gum is present as a component of the complex with fine cellulose and hence does not give a pasty feel while having its own function.

Furthermore, the complex of the present invention is characterized in that a food composition containing the complex has no undesirable feel such as a rough feel though it contains cellulose as water-insoluble dietary fiber. Attempts have been made to reduce the rough feel by reducing the particle size of the cellulose particles. In the present invention, this problem is solved by employing an aggregate structure comprising fine-cellulose particles and locust bean gum.

Besides locust bean gum, guar gum that is also a kind of galactomannan is preferable from the viewpoint of the disintegrating properties of particles of the complex because, like locust bean gum, guar gum has not only a property of interacting with cellulose but also a property of swelling and dissolving in cold water. Guar gum, however, has the disadvantage in that it gives a pasty feel to food because of its high solubility. Therefore, it is absolutely necessary in the present invention to use locust bean gum that is insoluble in cold water.

The fine-cellulose-containing complex of the present invention contains 2 to 12 wt % of locust bean gum. When the proportion of locust bean gum is more than 12 wt %, a pasty feel is given. When the proportion is less than 2 wt %, the feel of body and the heat shock resistance are unsatisfactory. An especially preferable proportion is 3 to 10 wt %.

The xanthan gum used in the present invention has a structure which has a main chain having the same molecular structure as that of cellulose, i.e., a main chain comprising glucose residues linearly linked to one another by β-1,4-glucoside linkages and in which a trisaccharide formed by a combination of α-D-mannose, β-D-glucuronic acid and β-D-mannose is bonded as a side chain to every other glucose residue of the main chain. An acetyl group and a pyruvic acid group are bonded to the aforesaid trisaccharide. The molecular weight of the xanthan gum is generally 1,000,000 or more.

The hydrophilic material(s) used in the present invention according to need is a material(s) that has a high solubility in cold water and hardly imparts viscosity. The hydrophilic material(s) is one or more materials selected from dextrins, water-soluble sugars (e.g. glucose, fructose, sucrose, lactose, isomerized syrup, xylose, trehalose, coupling sugar, palatinose, sorbose, reducing starch saccharification syrup, maltose, lactulose, fructooligosaccharide and galactooligo-saccharide), sugar alcohols (e.g xylitol, maltitol, mannitol, and sorbitol), and low-viscosity water-soluble dietary fibers (e.g. polydextrose and indigestible dextrin). The dextrins are especially suitable.

The dextrins used in the present invention are partial-degradation products produced by hydrolysis of starch with an acid or enzyme and heat. As the dextrins, there are used those comprising glucose residues linked by β-1,4 linkages or a combination of β-1,4 linkage and β-1,6 linkage and having a DE (dextrose equivalent) value of approximately 2 to 42. Branched dextrins free of glucose and low-molecular weight oligosaccharides can also be used.

The fine-cellulose-containing complex of the present invention is characterized also in that when stirred in water, the complex is not dispersed in water as it is in the form of the complex, but is disintegrated into fine particles composed mainly of fine-cellulose particles. The fine-cellulose particles formed by the disintegration are composed of submicron particles (cylindrical particles with a length of 100 to 300 nm and a width of approximately 20 to 60 nm) and particles with a length of about 1 μm or more. The existing microcrystalline cellulose complexes disclosed in JP-A-54-54169, JP-A-54-55762 and JP-A-54-157875 also give the same fine-cellulose particles as above when stirred under vigorous dispersion conditions (stirring of a 1% aqueous suspension at 25° C and 15000 rpm for 5 minutes with an Ace Homogenizer) described hereinafter. In this case, many submicron particles are singly present and contribute to the suspension stabilization of themselves and other solid particle components. However, in the case of the submicron particles formed from the fine-cellulose-containing complex of the present invention, a few of them are singly present, and the submicron particles form a structure composed of tens or more of the submicron particles sparsely aggregated. It is conjectured that this is probably because fine-cellulose particles have been crosslinked by locust bean gum.

Simultaneous use of xanthan gum and the hydrophilic material(s) is a preferable embodiment because it permits both the improvement of the water-dispersibility and the reduction of the pasty feel. That is, depending on the use of the complex, the pasty feel becomes more remarkable in some cases with the approach of the proportion of xanthan gum to 8 wt % even if the proportion is 8 wt % or less, the above-mentioned value. In this case, both a sufficient water-dispersibility and a good texture can be attained by blending the hydrophilic material(s). The proportion of the hydrophilic material(s) is preferably 0.5 to 35 wt %, more preferably 1 to 30 wt %.

The fine-cellulose-containing complex of the present invention may properly contain components usable in food, such as starches, fats and oils, proteins, salts (e.g. sodium chloride and various phosphates), emulsifiers, thickening stabilizers, acidulants, sweeteners, perfumes, coloring matters, etc., besides fine cellulose, locust bean gum, xanthan gum and the hydrophilic material(s) used according to need. In particular, thickening stabilizers used in food, such as carrageenan, sodium carboxymethylcellulose, Gellan gum and the like may be blended singly or in combination in order to adjust the dispersed state of the complex. The proportion of each component is at most 37.5 wt % in total and should be properly determined in view of the balance between functions (e.g. stability) and viscosity.

The fine-cellulose-containing complex of the present invention is characterized in that it is not a mere mixture of fine-cellulose powder, locust bean gum powder, xanthan gum powder and the hydrophilic material(s), but particles having such a characteristic structure that each particle contains one or more fine-cellulose particles and the other components, which are present around the fine-cellulose particles; and dry powder comprising a group of the particles having the characteristic structure.

The fine-cellulose-containing complex of the present invention is characterized also in that when stirred in water, the complex is not dispersed in water as it is in the form of the complex, but is disintegrated into fine particles composed mainly of fine-cellulose particles. The fine-cellulose particles formed by the disintegration are composed of submicron particles (cylindrical particles with a length of 100 to 300 nm and a width of approximately 20 to 60 nm) and particles with a length of about 1 μm or more. The existing microcrystalline cellulose complexes disclosed in JP-A-54-54169, JP-A-54-55762 and JP-A-54-157875 also give the same fine-cellulose particles as above when stirred under vigorous dispersion conditions (stirring of a 1% aqueous suspension at 25° C. and 15000 rpm for 5 minutes with an Ace Homogenizer) described hereinafter. In this case, many submicron particles are singly present and contribute to the suspension stabilization of themselves and other solid particle components. However, in the case of the submicron particles formed from the fine-cellulose-containing complex of the present invention, a few of them are singly present, and the submicron particles form a structure composed of tens or more of the submicron particles sparsely aggregated. It is conjectured that this is probably because fine-cellulose particles have been crosslinked by locust bean gum.

In general, a particle component capable of contributing to the suspension stability of a dispersion has such a colloidal property that the particle component is hardly precipitated by centrifugation. Such a property can be evaluated by a parameter called a colloid fraction. A higher value of the colloid fraction means a more remarkable colloidal property. The colloid fraction of existing microcrystalline cellulose complexes is more than 30%, while that of the fine-cellulose-containing complex of the present invention is 30% or less, preferably not more than 20% and not less than 2%, more preferably not more than 10% and not less than 2.5%. The suspension stability in water becomes higher with an increase of the value of the colloid fraction, though in the present invention, suspension stabilization can be achieved in an ice cream mix without any problem in practice even at a relatively low colloid fraction value of 30%. When the colloid fraction is more than 30%, the viscosity is increased, resulting in a pasty feel. Moreover, in the case of acidic food composed mainly of a milk component, milk protein and fine-cellulose particles are aggregated to cause syneresis. Conditions for measuring the colloid fraction in the present invention are described hereinafter (The colloid fraction of a fine-cellulose-containing complex).

Another characteristic of the fine-cellulose-containing complex of the present invention is that the complex is disintegrated during its dispersion in water and moreover, undergoes disintegration phenomenon easily even under relatively mild stirring conditions, i.e., conditions of so-called mild dispersion (for example, stirring conditions under which a mix is prepared in the production of an ice cream type article) in the production of food. That is, the fine-cellulose-containing complex of the present invention has such a property that particles of the complex are rapidly disintegrated also when the complex is stirred in warm water by the use of, for example, a convection dispersing machine or a homomixer. Slightly disintegrable particles tend to choke the orifice of a high-pressure homogenizer generally used for producing food, so that stable production of the food is difficult. Very slightly disintegrable particles absorb water and swell to a size larger than that in the dry state in some cases. In this case, the tendency of the high-pressure homogenizer to undergo blocking is further strengthened.

The complex of the present invention should satisfy the following requirements when dispersed under the above-mentioned mild dispersion conditions: the average particle size of dispersed particles formed by disintegration is 60 μm or less, and the proportion of particles with a particle size of 100 μm or more among the formed particles is 30 vol % or less based on the total volume of the formed particles. The proportion of coarse particles having a particle size of 100 μm or more is preferably lower, and the average particle size is preferably smaller. The proportion of particles having a particle size of 100 μm or more is preferably 25 vol % or less and the average particle size is preferably 40 μm or less. The proportion of particles having a particle size of 100 μm or more is more preferably 15 vol % or less and the average particle size is more preferably 25 um or less.

Since the complex of the present invention has such properties, the complex has the advantage not only in that food containing the complex exhibits a stable productivity and an excellent texture, but also in that particularly in the production of ice cream, a liquid mix as a stable raw material for an ice cream type article can be homogenized stably for a long period of time without causing blocking in a high-pressure homogenizer. The dispersion conditions and a measuring method are described in detail hereinafter (The average particle size of solid particles formed by the mild dispersion of a fine-cellulose-containing complex in water at 85° C., and the proportion of particles with a particle size of 100 μm or more among the formed particles).

The fine-cellulose-containing complex of the present invention is preferably such that the average particle size (measured with a laser diffraction scattering type particle size distribution measuring apparatus) of solid particles formed in water under conditions of dispersion by a higher shearing force corresponding to a homogenizer, i.e., vigorous dispersion conditions, is about 20 μm or less. The average particle size is more preferably 15 μm or less, still more preferably 10 μm or less. When the solid particles are small, the suspension stability is good, resulting in a reduced rough feel and hence a good texture. The conditions of the vigorous dispersion in water are described hereinafter (The average particle size of solid particles formed by the vigorous dispersion of a fine-cellulose-containing complex).

A motive for the present invention is to improve the water-dispersibility of a complex of micro-crystalline cellulose and galactomannan gum and develop an additive for well-balanced ice cream type articles. However, it was found that surprisingly, an ice cream type article containing the fine-cellulose-containing complex of the present invention has a higher solubility in the mouth, a plainer texture and stronger flavors of milk and egg than those that do not contain the complex. Among conventional microcrystalline cellulose complexes, not to mention water-soluble gums such as locust bean gum, no material has been reported which brings about such effects merely when additionally blended without reduction of any component. A liquid mix as a raw material for an ice cream type article which contains the complex of the present invention tends to have a reduced viscosity. This fact suggests that the complex of the present invention affects the aggregation of fat globules in the liquid mix. It is conjectured that the high solubility in the mouth and the enhancement of the flavors are also effects that are brought about by some influence or other of the complex of the present invention on the aggregate structure of fat globules.

The present inventive complex comprising fine cellulose, locust bean gum, xanthan gum and optionally the hydrophilic material(s) is produced not by merely mixing fine-cellulose powder, locust bean powder, xanthan gum powder and optionally powder of the hydrophilic material(s), but by mixing and grinding, at the same time, fine cellulose and the other components, in a water-containing state, i.e., a slurry state, a paste state, a gelatinous state or a cakey state, and then drying them. It is important to mix and grind all the components in the water-containing state at the same time to fit the surfaces of fine-cellulose particles to locust bean gum, xanthan gum and the hydrophilic material(s) sufficiently. This step is referred to as “wet co-grinding”. In this case, it is absolutely necessary to mix and grind all the components at the same time. By the mixing and grinding, complex particles can be obtained which are disintegrable under the above-mentioned mild dispersion and vigorous dispersion conditions. By contrast, when a method is adopted which comprises mixing and grinding hydrolyzed cellulose and locust bean gum and then blending xanthan gum therewith, followed by further mixing, as in the technique disclosed in JP-A-4-502409, the resulting particles are not disintegrable under the mild dispersion condition because the cellulose and locust bean gum have a sturdy aggregate structure.

In the present invention, by means of the drying step carried out after the mixing and grinding, xanthan gum and the hydrophilic material(s) are made present in the whole dried particles, but not on the surfaces of the dried particles, so that proper disintegrating properties are imparted. The reason is conjectured as follows: by these steps for the production, an interaction between fine-cellulose particles and locust bean gum is probably caused, so that during stirring in water, fine-cellulose particles (1 μm or less) are not present substantially alone and that a component composed of locust bean gum and a plurality of fine-cellulose particles is produced.

A process for producing the fine-cellulose-containing complex of the present invention is more concretely explained below.

The fine-cellulose-containing complex of the present invention can be obtained by depolymerizing a cellulosic material (e.g. wood pulp, purified linter, regenerated cellulose, or plant fiber derived from a cereal or fruit) to an average polymerization degree of 30 to 375 by acid hydrolysis, alkali oxidative degradation, enzymatic degradation, steam explosion degradation, hydrolysis using sub-critical water or super-critical water, or a combination thereof, adding thereto locust bean gum, xanthan gum and optionally a hydrophilic material(s), and subjecting the resulting mixture to so-called wet co-grinding, i.e., mixing and grinding conducted at the same time by a mechanical shearing force in the presence of water in an amount of 20 to 60 wt %, followed by drying and grinding of the thus treated mixture.

Although water may be added all at once in a necessary amount, water may be added stepwise in order to keep the conditions of the system and operations most suitable, when the amount of the gum components is increased depending on the use of the complex and hence the system is gradually hardened during the mixing and grinding, so that the mixing and grinding become difficult.

For the wet co-grinding, a kneader, mixing machine, extruder or the like can be used. For the object of the present invention, these machines may be used singly or in combination of two or more thereof. A good result can be obtained also by two or more runs of the treatment.

In order to dry the mixture of fine cellulose, locust bean gum, xanthan gum and optionally the hydrophilic material(s), a well-known method may be adopted. For example, a drying method using trays, belt drying method, fluidized bed drying method, freeze drying method and microwave drying can be adopted. The upper limit of the water content after the drying is preferably 15 wt % or less, in particular, 10 wt % or less, more preferably 6 wt % or less, in view of the ease of handling and stability over a long period of time.

The dried mixture is properly ground by a suitable method using an impact grinder, a jet mill or the like, so that substantially the whole of the resulting powder can pass through a screen having a screen opening of 425 μm. As the average particle size of the powder, 10 to 250 μm, in particular, 20 to 150 μm, is suitable for use.

The utilization of the complex of the present invention in food is explained below.

The ice cream type articles referred to herein are foods obtained by stirring and freezing of a mixture prepared by adding the fine-cellulose-containing complex of the present invention and materials selected from water, fats and oils (e.g. coconut oil, palm oil and palm kernel oil), sweeteners (e.g. sucrose, glucose, isomerized syrup, starch syrup, maltose syrup powder and *Stevia rebaudiana*), emulsifiers (e.g. glycerol fatty acid esters, sucrose fatty acid esters, sorbitan fatty acid esters, propylene glycol fatty acid esters and lecithin), coloring agents (e.g. azo dyes, xanthene dyes, triphenylmethane dyes, indigo dyes, sodium iron (copper) chlorophyllin, water-soluble annatto, β-carotene, riboflavin, cochineal, curcumine, grape rind pigment, calcimine yellow, lac dyes and beet red), flavoring materials (e.g. vanilla, fruit flavor, coffee flavor and chocolate flavor), stabilizers (e.g. gelatin, sodium alginate, sodium carboxymethylcellulose, guar gum, locust bean gum, carageenan, pectin, gum arabic, karaya gum and xanthan gum), egg, sarcocarp, fruit juice, nuts, etc. to a material(s) selected from milk and dairy products (e.g. raw milk, cream, butter, butter oil, condensed milk, enriched milk, skim milk powder, whole-fat powdered milk, butter milk and whey powder). The ice cream type articles include, for example, ice cream (total milk solid 15.0 wt % or more, and milk fat content 8.0 wt % or more), ice milk (total milk solid 10.0 wt % or more, and milk fat content 3.0 wt % or more) and lactic ice (total milk solid 3.0 wt % or more). A conventional process for producing the ice cream type article comprises steps of blending of weighed starting materials, heating•dissolution•mixing, filtration, homogenization, sterilization, cooling (5° C. or lower), addition of a flavoring material(s), aging, freezing, packing into containers, packaging, and hardening (−20 to −40° C.). The product in the freezing step is obtained as, for example, soft ice cream (also included among the ice cream articles of the present invention) as it is.

The ice cream type articles are obtained as articles containing air besides the above-mentioned starting materials. The amount of air contained in the article is referred to as overrun. The overrun is represented by the following equation:

$$\text{Overrun }(\%)=100\times\{(\text{weight of mix})-(\text{weight of the same volume of ice cream})\}/(\text{weight of the same volume of ice cream})$$

The term "(ice cream) mix (liquid)" used here means the starting materials in an emulsified state, i.e., intermediate materials before freezing. The ice cream type article of the present invention has a value of this overrun of approximately 10 to 200%.

Although the proportion of the fine-cellulose-containing complex of the present invention should be properly determined because a suitable value for the proportion varies depending on the recipe, in particular, the fat content, the proportion is approximately 0.05 to 1.0 wt %, preferably 0.1 to 0.4 wt %. When the fat content is low, the body of the product is usually deteriorated, but the fine-cellulose-containing complex of the present invention can make up this deficiency. Therefore, the incorporation of said complex into a low-fat ice cream type article is a suitable embodiment.

The fine-cellulose-containing complex of the present invention is used in not only ice cream type articles but also table luxuries such as coffee, black tea, powdered tea, cocoa, adzuki-bean soup, juice, etc.; milky drinks such as raw milk, processed milk, sour milk beverages, soybean milk, etc.; various drinks including fortified drinks (e.g. calcium-fortified drinks) and dietary-fiber-containing drinks; dairy products such as butter, cheese, yogurt, coffee whitener, whipping cream, custard cream, custard pudding, etc.; fat and oil processed foods such as mayonnaise, margarine, spread, shortening, etc.; various soups; stews; seasonings such as sauces, gravy, dressing, etc.; various spice pastes represented by mustard paste; various fillings represented by jam and flour paste; gelatinous or paste like foods including various bean jams and jellies; foods composed mainly of a cereal, such as bread, noodles, pasta, pizza, cornflakes, etc.; cakes and Japanese-style confections, which include candy, cookies, biscuits, hot cake, chocolate, rice cake, etc.; marine paste products represented by boiled fish paste and cake of pounded fish; livestock products represented by ham, sausage, hamburger steak, etc.; various daily dishes such as cream croquettes, bean jam for Chinese dishes, gratin, fried or steamed dumplings stuffed with minced pork, etc.; foods of delicate flavor, such as salted fish guts, vegetables pickled in sake lees, etc.; liquid foods such as liquid foods for tube feeding, etc.; supplements; "pet foods"; and the like. The fine-cellulose-containing complex of the present invention can be used in these foods though the foods are different in form and the processing method for preparation at the time of use, as retorts, powder food, tablet food, frozen food, food for electronic ovens, etc.

The fine-cellulose-containing complex of the present invention acts as a base material for calorie reduction such as a fat replacer, a body-imparting agent, a shape-keeping agent, a syneresis-preventing agent, a dough-modifying agent, and a dietary fiber material. Moreover, said complex is effective in unifying the taste of food as a whole because it reduces irritative acidity, greasy smells and the like. In addition, said complex imparts "substance" like that of fat. Although the mechanism of this action is not known, the following is conjectured: as described above, in food, tens or more fine-cellulose particles form a structure in which they are sparsely aggregated owing to locust bean gum, and therefore, this structure has some effect on taste buds.

That is, the food composition of the present invention is characterized by having a plain texture and a good solubility in the mouth in spite of its proper body. Moreover, said food composition has little irritative taste and has a unified taste as a whole. These characteristics are especially beneficial effects in low-fat food.

The food composition containing the complex of the present invention has no undesirable feel such as a rough feel though it contains cellulose as water-insoluble dietary fiber. Thus, it has become possible to incorporate water-insoluble dietary fiber into acidic food containing a milk component(s), such as yogurt. In such food, it has usually been difficult to avoid the following trouble: cellulose fine particles and the milk component(s) interact with each other, resulting in insufficient curding into hard yogurt or syneresis. However, it is conjectured that since only a few cellulose fine particles are present singly in the case of the fine-cellulose-containing complex used in the present invention, the above-mentioned interaction is suppressed.

Although the content of the fine-cellulose-containing complex of the present invention in the food composition should be properly determined depending on the use of the complex because it is dependent on the kind and fat content of the food or the amount of dietary fiber desired to be incorporated, the content is approximately 0.05 to 90 wt %, preferably 0.1 to 20 wt %, in particular, 0.5 to 10 wt %.

The food composition is produced by a well-known process and the fine-cellulose-containing complex may be added with suitable timing, for example, the complex may be added together with a powder material for the food composition. When there is a dispersing step or a homogenizing step, the complex is preferably blended before the dispersing or homogenizing step. It is especially preferable to produce the food composition by blending the complex with water or an aqueous solution or dispersion of a nonionic component such as sugar, subjecting the resulting mixture to a dispersing step, and then mixing the resulting dispersion with other components.

The present invention is more concretely explained below with examples. These examples should not be construed as limiting the technical scope and embodiment of the invention.

For the substances obtained in the examples and comparative examples and production processes thereof, the measurement of physical properties and evaluation are carried out by the following methods.

<The Average Particle Size of Solid Particles Formed by the Mild Dispersion of a Fine-Cellulose-Containing Complex in Water at 85° C., and the Proportion of Particles With a Particle Size of 100 μm or More Among the Formed Particles>

(1) Distilled water at 85° C. is added to 20.0 g of a sample (solids) to make a total weight of 2000 g.

(2) The resulting sample aqueous suspension is subjected to dispersion (mild dispersion) at 8000 rpm for 5 minutes with a homomixer (T.K Homomixer Model Mark II 2.5, mfd. by Tokushu Kika Kogyo Co., Ltd.) while maintaining the temperature of the sample aqueous suspension at 85° C.

(3) The particle size distribution is measured with a laser diffraction scattering type particle size distribution measuring apparatus (Model LA-910, mfd. by HORIBA Seisakusho LTD.) without ultrasonic dispersion treatment, by setting the refractive index at 1.20-0.00i and the number of repetitions of data entrance at 10. The average particle size is expressed as a particle size corresponding to a cumulative volume percentage of 50%. The amount of particles of 100 μm or more is expressed as vol %.

<The Average Particle Size of Solid Particles Formed by the Vigorous Dispersion of a Fine-Cellulose-Containing Complex>

(1) Distilled water at 25° C. is added to 3.0 g of a sample (solids) to make a total weight of 300 g.

(2) The resulting mixture is subjected to dispersion (vigorous dispersion) at 15000 rpm for 5 minutes with Ace Homogenizer (AM-T, mfd. by Nihon Seiki Ltd.).

(3) After ultrasonic treatment for 1 minute, the particle size distribution is measured with a laser diffraction scattering type particle size distribution measuring apparatus (Model LA-910, mfd. by HORIBA Seisakusho LTD.) by setting the refractive index at 1.20-0.00i and the number of repetitions of data entrance at 10. The average particle size is expressed as a particle size corresponding to a cumulative volume percentage of 50%.

<The Colloid Fraction of a Fine-Cellulose-Containing Complex>

(1) Distilled water at 25° C. is added to 3.0 g of a sample (solids) to make a total weight of 300 g.

(2) The resulting mixture is subjected to dispersion (vigorous dispersion) at 15000 rpm for 2 minutes with Ace Homogenizer (AM-T, mfd. by Nihon Seiki Ltd.).

(3) Ten milliliters of the resulting dispersion is accurately measured into a weighing bottle and accurately weighed.

(4) Forty milliliters of the residual dispersion is transferred to a polypropylene copolymer centrifuge tube with a capacity of 50 ml and centrifuged at 2000 rpm for 15 minutes (an inverter•multipurpose high-speed refrigerated centrifuge Model 6930 manufactured by Kubota Seisakusho Co., Ltd.; using RA-400 angle rotor, about 480×g). Ten milliliters of the supernatant is accurately measured into a weighing bottle and accurately weighed.

(5) The same operation as in (4) is carried out except for changing the centrifuge conditions to centrifuge at 15100×g for 30 minutes.

(6) Each of the weighing bottles in (3), (4) and (5) is heated in a dryer at 105° C. for 10 hours to evaporate the contents to dryness.

(7) The solids in the weighing bottle in (3) are accurately weighed (A g).

(8) The solids in the weighing bottle in (4) are accurately weighed (B g).

(9) The solids in the weighing bottle in (5) are accurately weighed (C g).

(10) The colloid fraction is calculated by the following equation:

$$\text{Colloid fraction }(\%)=(B-C)/(A-C)\times 100$$

<Physical Properties Test on an Ice Cream Type Article>

<<Heat Shock Resistance Test>>

(1) An ice cream type article kept in a cup is maintained at −20° C. for 1 day and then at +5° C. for 10 minutes. This procedure is repeated 5 times.

(2) The ice cream type article is tasted and the rough feel of the ice crystals formed is evaluated.

(3) The result was evaluated according to the following criterion:

a: no rough feel of the ice crystals (a feel equal to that before the test), b: very slight rough feel of the ice crystals, c: considerable rough feel of the ice crystals, d: intense rough feel of the ice crystals.

<<Stability of the Homogenization of a Liquid Raw Material>>

The stability was evaluated on the basis of pressure variation accompanying blocking in a homogenizer for liquid raw material, according to the following criterion. The narrower the range of the variation, the higher the stability.

a: a pressure variation in a range of ±0.5 MPa, b: a pressure variation in a range of ±1 MPa, c: a pressure variation outside a range of ±1 Mpa without blocking, d: blocking during the homogenization.

<Texture Evaluation Test>

<<Evaluation of the Texture of an Ice Cream Type Article>>

The texture was evaluated by the use of an article containing no cellulose complex (Comparative Example 17), as a standard with respect to the following items according to the following criteria:

<<<Feel of Body>>> a: a stronger feel of body than that of Comparative Example 17, b: substantially the same feel of body as that of Comparative Example 17.

<<<Solubility in the Mouth>>> a: a higher solubility in the mouth than that of Comparative Example 17 b: substantially the same solubility in the mouth as that of Comparative Example 17, c: a lower solubility in the mouth than that of Comparative Example 17 (namely, a pasty feel), d: a considerably stronger pasty feel than that of Comparative Example 17.

<<<Rough Feel>>> a: no rough feel (the same as in Comparative Example 17), b: a slight rough feel.

<<Evaluation of the Texture of a Dressing Type Article>>

The texture was evaluated by the use of an article containing no cellulose complex (Comparative Example 28), as a standard with respect to the following items according to the following criteria:

<<<Feel of Body>>> a: a stronger feel of body than that of Comparative Example 28, b: substantially the same feel of body as that of Comparative Example 28.

<<<Solubility in the mouth>>> a: a higher solubility in the mouth than that of Comparative Example 28 b: substantially the same solubility in the mouth as that of Comparative Example 28, c: a lower solubility in the mouth than that of Comparative Example 28 (namely, a pasty feel), d: a considerably stronger pasty feel than that of Comparative Example 28.

<<<Rough Feel>>> a: no rough feel (the same as in Comparative Example 28), b: a slight rough feel.

<<<Taste/Unity>>> a: substance due to yolk is perceived without a keen acidity and a greasy smell, b: a keen acidity and a greasy smell are perceived a little, c: a keen acidity and a greasy smell are strongly perceived (to the same degree as in Comparative Example 28).

The present invention is concretely explained with the following examples and comparative examples.

EXAMPLES 1 TO 7

Commercial DP pulp was cut, and then hydrolyzed in 7% hydrochloric acid at 105° C. for 20 minutes, and the resulting acid-insoluble residue was filtered and then washed to obtain a wet cake (solids content 46 wt %) of hydrolyzed cellulose. Locust bean gum, xanthan gum and dextrin were blended with the hydrolyzed cellulose in the proportions shown in Table 1, followed by adding thereto water in an amount suitable for kneading them at a proper state, and all the components were mixed and ground at the same time with a kneader for 3 hours to be subjected to so-called wet co-grinding. Subsequently, the resulting mixture was dried in a hot-air dryer at 60° C. and then ground to obtain fine-cellulose-containing complexes A to G. Physical properties of these fine-cellulose-containing complexes are shown in Table 1. The average particle size of dry powder was measured by a sieving method and expressed as a particle size corresponding to 50 wt % passage. As the aforesaid locust bean gum, purified-type locust bean gum was used in the complexes A to E, and unpurified-type locust bean gum in the complexes F and G.

EXAMPLES 8 TO 14

Lactic ices were prepared by using each of the fine-cellulose-containing complexes A to G obtained in Examples 1 to 7. In detail, starch syrup (10 parts by weight) was put into water (65.25 parts by weight) heated at 40° C., followed by adding thereto skim milk powder (10 parts by weight), sucrose (10 parts by weight), glycerol fatty acid ester (0.25 part by weight) and each fine-cellulose-containing complex listed in Table 2 (0.2 part by weight) with stirring and mixing. Then, coconut oil (4 parts by weight) was added thereto, and the resulting mixture was heated to 80° C. and then stirred in a homomixer for 10 minutes to effect dissolution. The resulting solution was homogenized with a Manton Gaulin type homogenizer at a pressure of 15.3 MPa, after which vanilla extract (0.3 part by weight) was added thereto and the resulting mixture was aged at 5° C. for 16 hours. The aged mixture was frozen to be hardened, whereby lactic ices were obtained. The homogenization with the Manton Gaulin type homogenizer could be stably carried out without clogging of a piping while keeping the homogenization pressure constant.

The texture of the obtained lactic ices was evaluated according to the above-mentioned criteria. All the lactic ices had such a texture that they were good in solubility in the mouth and free from a pasty feel in spite of their feel of body, and they received a high rating for heat shock resistance. The stability of the homogenization of the liquid raw material was also good. The evaluation results are shown in Table 2.

COMPARATIVE EXAMPLES 1 TO 3

Locust bean gum, xanthan gum and dextrin were blended with a wet cake of hydrolyzed cellulose obtained in the same manner as in Example 1, in the proportions shown in Table 3, followed by adding thereto water in an amount suitable for kneading them at a proper state, and all the components were mixed and ground at the same time with a kneader for 3 hours to be subjected to so-called wet co-grinding. Subsequently, the resulting mixture was dried in a hot-air dryer at 60° C. and then ground to obtain fine-cellulose-containing complexes H, I and J. Physical properties of these fine-cellulose-containing complexes are shown in Table 3. As the aforesaid locust bean gum, purified-type locust bean gum was used in the complexes H and J, and unpurified-type locust bean gum in the complex I.

COMPARATIVE EXAMPLES 4 AND 5

Fine-cellulose-containing complexes were prepared according to the process disclosed in JP-A-54-54169. In detail, at first, commercial DP pulp was cut, and then hydrolyzed in 0.8% hydrochloric acid at 110° C. for 90 minutes, and the resulting acid-insoluble residue was filtered and then washed to obtain a wet cake (solids content 51 wt %) of hydrolyzed cellulose. A combination of xanthan gum and dextrin or a combination of purified locust bean gum, sucrose and glucose was blended with the hydrolyzed cellulose in the proportions shown in Table 3, followed by adding thereto water if necessary, and the resulting mixture was kneaded in a kneader for 3 hours to be subjected to so-called wet co-grinding. Subsequently, the kneaded mixture was dried in a hot-air dryer at 80° C. and then ground to obtain fine-cellulose-containing complexes K and L. Physical properties of these fine-cellulose-containing complexes are shown in Table 3.

COMPARATIVE EXAMPLE 6

A fine-cellulose-containing complex was prepared according to the process disclosed in JP-A-54-55762. In detail, at first, purified linter was hydrolyzed in 9.1% hydrochloric acid at 105° C. for 15 minutes, and the resulting acid-insoluble residue was filtered and then washed to obtain a wet cake (solids content 49 wt %) of hydrolyzed cellulose. Guar gum and dextrin were blended with the hydrolyzed cellulose in the proportions shown in Table 3, followed by adding thereto water if necessary, and the resulting mixture was kneaded in a kneader for 90 minutes to be subjected to so-called wet co-grinding. Subsequently, the kneaded mixture was air-dried and then ground to obtain a fine-cellulose-containing complex M. Physical properties of this fine-cellulose-containing complex are shown in Table 3.

COMPARATIVE EXAMPLE 7

A fine-cellulose-containing complex was prepared according to the process disclosed in JP-A-54-157875. In detail, purified locust bean gum and dextrin were blended with a wet cake of hydrolyzed cellulose obtained in the same manner as in Comparative Example 4, in the proportions shown in Table 3, followed by adding thereto water if necessary, and the resulting mixture was kneaded in a kneader for 3 hours to be subjected to so-called wet co-grinding. Subsequently, the kneaded mixture was dried in a hot-air dryer at 80° C. and then ground to obtain a fine-cellulose-containing complex N. Physical properties of this fine-cellulose-containing complex are shown in Table 3.

COMPARATIVE EXAMPLE 8

A fine-cellulose-containing complex was prepared according to the process disclosed in JP-A-4-502409. In detail, at first, a wet cake of hydrolyzed cellulose obtained in the same manner as in Example 1 was kneaded in a kneader for 3 hours. Then, the kneaded product and purified locust bean gum were put into pure water so that the ratio of the cellulose to the locust bean gum was 8:2 in terms of solids, and the solids content was 10 wt %. The resulting mixture was made into a homogeneous slurry with a propeller agitator and a convection homomixer. Thereafter, the slurry was further homogenized at 17 MPa with a Manton Gohrin type homogenizer and spray-dried to obtain a fine-cellulose-containing complex O. Physical properties of this fine-cellulose-containing complex are shown in Table 3. Since the technique disclosed in JP-A-4-502409 is intended mainly to prevent degradation by shearing force in water, a technique comprising addition of an acid such as phosphoric acid is recommended in this reference. However, since the fine-cellulose-containing complex of the present invention has disintegrating properties, no phosphoric acid was added in Comparative Example 8 in order to make a clear comparison.

COMPARATIVE EXAMPLES 9 TO 16

Lactic ices were prepared in exactly the same manner as in Example 8 except for using each of the fine-cellulose-containing complexes H to O obtained in Comparative Examples 1 to 8, in place of the fine-cellulose-containing complex A, and were evaluated. The evaluation results are shown in Table 4. When each of the fine-cellulose-containing complexes I, J, M and O was blended, a piping was clogged during the homogenization with a Manton Gohrin type homogenizer, so that the homogenization could not be stably carried out. Also when each of the complexes L and N was blended, the piping was apt to be clogged, resulting in a pressure variation of approximately 2 to 3 MPa. When each of the complexes H and K was blended, the homogenization could be satisfactorily carried out but the lactic ices had a low solubility in the mouth and a so-called pasty feel when eaten.

COMPARATIVE EXAMPLE 17

Lactic ice was prepared in exactly the same manner as in Example 8 except that no fine-cellulose-containing complex was blended therein, and the product was evaluated. The evaluation results are shown in Table 4. The homogenization could be satisfactorily carried out because no fine-cellulose-containing complex had been blended. The lactic ice had no rough feel but was insufficient in the feel of body and solubility in the mouth and very poor in heat shock resistance.

EXAMPLES 15 TO 18

Differences in texture were compared between each of lactic ices having different vegetable fat contents of 10, 8, 5 and 3 wt %, respectively, and containing the fine-cellulose-containing complex F (Example 6) of the present invention, and lactic ice (Comparative Example 18) having a vegetable fat content of 10 wt % and having no fine-cellulose-containing complex, whereby the substitutability of the fine-cellulose-containing complex for fat in lactic ice was tested.

At first, skim milk powder (8.0 parts by weight), the fine-cellulose-containing complex F (0.3 part by weight), sucrose (7.0 parts by weight), starch syrup (6.0 parts by weight), isomerized syrup (6.0 parts by weight) and 20% sweetened yolk (1.6 parts by weight) were added to water (61.1, 63.1, 66.1 or 68.1 parts by weight) heated at 40° C. The resulting mixture was heated to 85° C., after which coconut oil (10.0, 8.0, 5.0 or 3.0 parts by weight) was mixed therewith, and the thus obtained mixture was stirred in a homomixer for 10 minutes to effect dissolution. After the resulting solution was homogenized at a pressure of 15.3 MPa with a Manton Gaulin type homogenizer, vanilla extract (0.3 part by weight) was added thereto and the resulting mixture was aged at 5° C. for 16 hours. Then, the aged mixture was frozen to be hardened so as to be adjusted to an overrun value of 30%, whereby lactic ices were obtained. The homogenization with the Manton Gaulin type homogenizer could be stably carried out without clogging of a piping while keeping the homogenization pressure constant. The recipe and evaluation results are shown in Table 5.

The obtained lactic ices had such a texture that they were good in solubility in the mouth and free from a pasty feel in spite of their feel of body and good substance. They were compared with the lactic ice of Comparative Example 18 described hereinafter to find that the lactic ice having a vegetable fat content of 5.0 wt % (Example 17) and the lactic ice of Comparative Example 18 were equal in texture. Thus, it could be confirmed that the fine-cellulose-containing complex can be substituted for fat.

COMPARATIVE EXAMPLE 18

Skim milk powder (8.0 parts by weight), sucrose (7.0 parts by weight), starch syrup (6.0 parts by weight), isomerized syrup (6.0 parts by weight) and 20% sweetened yolk (1.6 parts by weight) were added to water (61.4 parts by weight) heated at 40° C. The resulting mixture was heated to 85° C., after which coconut oil (10.0 parts by weight) was mixed therewith, and the thus obtained mixture was stirred in a homomixer for 10 minutes to effect dissolution. After the resulting solution was homogenized at a pressure of 15.3 MPa with a Manton Gaulin type homogenizer, vanilla extract (0.3 part by weight) was added thereto and the resulting mixture was aged at 5° C. for 16 hours. Then, the aged mixture was frozen to be hardened so as to be adjusted to an overrun value of 30%, whereby lactic ice was obtained. The recipe and evaluation results are shown in Table 5.

EXAMPLES 19 TO 22

Differences in texture were compared between each of ice creams having different milk fat contents of 10, 8, 5 and 3 wt %, respectively, and containing the fine-cellulose-containing complex F (Example 6) of the present invention, and ice cream (Comparative Example 19) having a milk fat content of 10 wt % and containing no fine-cellulose-containing complex, whereby the substitutability of the fine-cellulose-containing complex for fat in ice cream was tested.

At first, skim milk powder (8.0 parts by weight), the fine-cellulose-containing complex F (0.3 part by weight), sucrose (7.0 parts by weight), starch syrup (6.0 parts by weight), isomerized syrup (6.0 parts by weight) and 20% sweetened yolk (1.6 parts by weight) were added to water (59.1, 61.5, 65.1 or 67.5 parts by weight) heated at 40° C. The resulting mixture was heated to 85° C., after which unsalted butter (12.0, 9.6, 6.0 or 3.6 parts by weight) was mixed therewith, and the thus obtained mixture was stirred in a homomixer for 10 minutes to effect dissolution. After the resulting solution was homogenized at a pressure of 15.3 MPa with a Manton Gaulin type homogenizer, vanilla extract (0.3 part by weight) was added thereto and the resulting mixture was aged at 5° C. for 16 hours. Then, the aged mixture was frozen to be hardened so as to be adjusted to an overrun value of 30%, whereby ice creams were obtained. The homogenization with the Manton Gaulin type homogenizer could be stably carried out without clogging of a piping while keeping the homogenization pressure constant. The recipe and evaluation results are shown in Table 6.

The obtained ice creams had such a texture that they were good in solubility in the mouth and free from a pasty feel in spite of their feel of body. They were compared with the ice cream of Comparative Example 19 described hereinafter to find that the ice cream having a milk fat content of 5.0 wt % (Example 21) and the ice cream of Comparative Example 19 were equal in texture. Thus, it was confirmed that the fine-cellulose-containing complex can be substituted for fat.

COMPARATIVE EXAMPLE 19

Skim milk powder (8.0 parts by weight), sucrose (7.0 parts by weight), starch syrup (6.0 parts by weight), isomerized syrup (6.0 parts by weight) and 20% sweetened yolk (1.6 parts by weight) were added to water (59.4 parts by weight) heated at 40° C. The resulting mixture was heated to 85° C., after which unsalted butter (12.0 parts by weight) was mixed therewith, and the thus obtained mixture was stirred in a homomixer for 10 minutes to effect dissolution. After the resulting solution was homogenized at a pressure of 15.3 MPa with a Manton Gaulin type homogenizer, vanilla extract (0.3 part by weight) was added thereto and the resulting mixture was aged at 5° C. for 16 hours. Then, the aged mixture was frozen to be hardened so as to be adjusted to an overrun value of 30%, whereby an ice cream reference standard was obtained. The recipe and evaluation results are shown in Table 6.

EXAMPLES 23 TO 29

Half-type mayonnaise-like dressings were prepared by using each of the fine-cellulose-containing complexes A to G. In detail, at first, 5 parts by weight of each fine-cellulose-containing complex and 36.7 parts by weight of water were mixed, and then stirred in a mixer for home use for 20 minutes. The resulting mixture was transferred to a Hobart mixer, and 0.4 part by weight of xanthan gum, 10 parts by weight of yolk and 1.9 parts by weight of water were added thereto with stirring at 150 rpm, and then stirred for 5 minutes. Thereafter, 35 parts by weight of salad oil was added thereto at a rate of about 20 g/min, and stirred for 10 minutes after completion of the addition. Subsequently, a mixed powder of 2.6 parts by weight of salt, 0.9 part by weight of sugar, 0.4 part by weight of mustard powder and 0.1 part by weight of sodium glutamate and 7 parts by weight of vinegar were added thereto, and stirred for 5 minutes. Until this stirring, the stirring at 150 rpm had been continued without stopping the Hobart mixer. Lastly, the resulting mixture was treated once with a colloid mill (clearance: 10 mil, and number of revolution: 3000 rpm), whereby the desired dressings were prepared.

Table 7 shows the viscosity (measured with a rotating viscometer; rate of shear 50 $s^{-1}$; and temperature 25° C.) of the dressings and the results of their sensory evaluation (feel of body, solubility in the mouth, rough feel, and unity of taste). Criteria for the sensory evaluation are as described above.

COMPARATIVE EXAMPLES 20 TO 27

Half-type mayonnaise-like dressings were prepared in exactly the same manner as in Example 23 except for using each of the fine-cellulose-containing complexes H to O in place of the fine-cellulose-containing complex A and properly adjusting the blending amounts of xanthan gum and water so that the viscosity became 2.5 to 4.2 Pa·s, and they were evaluated. The evaluation results are shown in Table 8.

COMPARATIVE EXAMPLE 28

Conventional mayonnaise containing no fine-cellulose-containing complex was prepared. In detail, at first 14 parts by weight of water and 10 parts by weight of yolk were placed in a Hobart mixer and stirred at 150 rpm for 3 minutes. Then, 65 parts by weight of salad oil was added thereto at a rate of about 20 g/min, and stirred for 10 minutes after completion of the addition. Subsequently, a mixed powder of 2.6 parts by weight of salt, 0.9 part by weight of sugar, 0.4 part by weight of mustard powder and 0.1 part by weight of sodium glutamate and 7 parts by weight of vinegar were added thereto, and stirred for 5 minutes. Until this stirring, the stirring at 150 rpm had been continued without stopping the Hobart mixer. Lastly, the resulting mixture was treated once with a colloid mill (clearance: 10 mil, and number of revolutions: 3000 rpm) to prepare the mayonnaise. The viscosity of the mayonnaise was 2.8 Pa·s. The mayonnaise was subjected to sensory evaluation to find that it had a rather insufficient feel of body, a relatively high solubility in the mouth and no rough feel, but had an irritative acidity due to vinegar and a greasy smell filling the mouth.

EXAMPLES 30 TO 32

Yogurts enriched with water-insoluble dietary fiber were prepared. In detail, 84.72 parts by weight of water, 5 parts by weight of raw cream ("Snow Brand Fresh", mfd. by Snow Brand Milk Products Co., Ltd.; milk fat content 40.0%, and nonfat milk solids content 4.5%), 8.28 parts by weight of skim milk powder ("Snow Brand Fresh", mfd. by Snow Brand Milk Products Co., Ltd.) and 2 parts by weight of the fine-cellulose-containing complex A, B or F (corresponding to Example 30, 31 or 32, respectively) were stirred in a propeller agitator at 80° C. for 30 minutes. The resulting mixture was homogenized (first stage: 9.8 MPa, and second stage 4.9 MPa) with a piston type homogenizer. Then, the mixture was allowed to cool to 30° C. with stirring in the propeller agitator, packed in a plastics cup with a capacity of 100 $cm^3$, and then fermented at 38° C. for 17 hours. The fermented mixture was stored at 5° C. for 5 hours and then evaluated.

The yogurts prepared by way of trial had been curded to have the appearance and hardness of so-called hard yogurt. The yogurts were free from syneresis, and when eaten, they had the same texture without a rough feel as that of the sample of Comparative Example 30.

COMPARATIVE EXAMPLE 29

An attempt was made to prepare hard yogurt in the same manner as in Example 30 except for using the fine-cellulose-containing complex K in place of the fine-cellulose-containing complex A. However, a finely aggregated state was brought about without curding, and syneresis took place.

COMPARATIVE EXAMPLE 30

Hard yogurt was prepared in the same manner as in Example 30 except for incorporating no fine-cellulose-containing complex and increasing the amount of water to the same extent. the resulting product was sufficiently curded hard yogurt free from syneresis.

TABLE 1

Compositions and physical properties of fine-cellulose-containing complexes

| Fine-cellulose-containing complex | Example 1 A | 2 B | 3 C | 4 D | 5 E | 6 F | 7 G |
|---|---|---|---|---|---|---|---|
| Composition [%] | | | | | | | |
| Fine cellulose | 60 | 70 | 70 | 75 | 80 | 70 | 65 |
| Locust bean gum (*) | 2.5 | 3 | 3 | 5 | 7 | 5 | 3 |
| Xanthan gum | 0.5 | 3 | 1 | 2 | 7 | 1 | 3 |
| Dextrin | 37 | 24 | 26 | 18 | 6 | 24 | 29 |
| Physical properties | | | | | | | |
| Warm water · mild dispersion/average particle size [µm] | 27 | 14 | 15 | 23 | 41 | 20 | 18 |
| Warm water · mild dispersion/particles of 100 µm or more [vol %] | 18 | 0.8 | 5.2 | 9.8 | 19 | 4.5 | 7.2 |
| Vigorous despersion/average particle size [µm] | 17 | 8.7 | 7.8 | 9.4 | 12 | 9.8 | 10 |
| Colloid fraction [%] | 21.6 | 17.2 | 3.7 | 5.6 | 21.3 | 4.1 | 6.4 |
| Average particle size of dry powder [µm] | 42 | 62 | 103 | 44 | 51 | 69 | 38 |

*At the locust bean gum, an unpurified-type one was used in the complexes F and G, and a purified-type one was used in the other complexes.

TABLE 2

Results of evaluation of lactic ices containing a fine-cellulose-containing complex

| Fine-cellulose-containing complex | Example 8 A | 9 B | 10 C | 11 D | 12 E | 13 F | 14 G |
|---|---|---|---|---|---|---|---|
| Results of evaluation of lactic ice | | | | | | | |
| Homogenization | b | a | a | a | b | a | a |
| Texture/feel of body | b | a | a | a | a | a | b |
| Texture/solubility in the mouth | a | a | a | a | b | a | a |
| Texture/rough feel | b | a | a | a | b | a | a |
| Heat shock resistance | b | a | a | a | a | a | a |

TABLE 3

Compositions and physical properties of fine-cellulose-containing complex

| Fine-cellulose-containing complex | Comparative Example 1 H | 2 I | 3 J | 4 K | 5 L | 6 M | 7 N | 8 O |
|---|---|---|---|---|---|---|---|---|
| Composition [%] | | | | | | | | |
| Fine cellulose | 55 | 70 | 85 | 70 | 70 | 60 | 60 | 80 |
| Locust bean gum (*) | 3 | 5 | 14 | — | 10 | — | 10 | 20 |
| Guar gum | — | — | — | — | — | 30 | — | — |
| Xanthan gum | 12 | — | 1 | 7 | — | — | — | — |
| Dextrin | 30 | 25 | — | 23 | — | 10 | 30 | — |
| Sucrose | — | — | — | — | 10 | — | — | — |
| Glucose | — | — | — | — | 10 | — | — | — |
| Physical properties | | | | | | | | |
| Warm water · mild dispersion/average particle size [µm] | 9.2 | 79 | 82 | 8.5 | 65 | 72 | 61 | 130 |
| Warm water · mild dispersion/particles of 100 µm or more [vol %] | 0.0 | 37 | 44 | 0.0 | 34 | 38 | 36 | 62 |
| Vigorous despersion/average particle size [µm] | 8.9 | 14 | 22 | 7.8 | 8.7 | 9.1 | 8.5 | 32 |
| Colloid fraction [%] | 31.0 | 2.1 | 5.9 | 45.0 | 18.0 | 12.1 | 15.7 | 0.1 |
| Average particle size of dry powder [µm] | 35 | 65 | 106 | 58 | 61 | 95 | 75 | 118 |

*At the locust bean gum, an unpurified-type one was used in the complex I, and a purified-type one was used in the other complexes.

TABLE 4

Results of evaluation of lactic ices containing a fine-cellulose-containing complex

| Fine-cellulose-containing complex | Comparative Example 9 H | 10 I | 11 J | 12 K | 13 L | 14 M | 15 N | 16 O | 17 — |
|---|---|---|---|---|---|---|---|---|---|
| Results of evaluation of lactic ice | | | | | | | | | |
| Homogenization | a | d | d | a | c | d | c | d | a |
| Texture/feel of body | a | b | a | a | a | a | a | b | — |

TABLE 4-continued

Results of evaluation of lactic ices containing a fine-cellulose-containing complex

| Fine-cellulose-containing complex | Comparative Example 9 H | 10 I | 11 J | 12 K | 13 L | 14 M | 15 N | 16 O | 17 — |
|---|---|---|---|---|---|---|---|---|---|
| Texture/solubility in the mouth | d | b | c | d | b | d | b | c | — |
| Texture/rough feel | b | b | b | a | b | b | b | b | — |
| Heat shock resistance | a | c | a | c | c | c | c | c | d |

TABLE 5

Results of evaluation of ices (lactic ices) obtained by using a fine-cellulose-containing complex as a substitute for fat

| | Comparative Example 18 | Example 15 | Example 16 | Example 17 | Example 18 |
|---|---|---|---|---|---|
| Composition [%] | | | | | |
| Total solid content | 34.96 | 35.26 | 32.26 | 30.26 | 28.26 |
| Vegetable fat content | 10.00 | 10.00 | 8.00 | 5.00 | 3.00 |
| Nonfat milk solid content | 8.00 | 8.00 | 8.00 | 8.00 | 8.00 |
| Yolk fat content | 0.40 | 0.40 | 0.40 | 0.40 | 0.40 |
| Proportion of fine-cellulose-containing complex F [wt %] | — | 0.30 | 0.30 | 0.30 | 0.30 |
| Results of evaluation of lactic ice | | | | | |
| Homogenization | Pressure variation range of ±0.5 Mpa | Pressure variation range of ±0.5 Mpa | Pressure variation range of ±0.5 Mpa | Pressure variation range of ±0.5 Mpa | Pressure variation range of ±0.5 Mpa |
| Texture/feel of body and substance | — | Superior to Comparative Example 18 | Superior to Comparative Example 18 | Equal to Comparative Example 18 | Inferior to Comparative Example 18 |
| Texture/solubility in the mouth | Good | Good | Good | Good | Good |
| Texture/rough feel | None | None | None | None | None |

TABLE 6

Results of evaluation of ices (ice creams) obtained by using a fine-cellulose-containing complex as a substitute for fat

| | Comparative Example 19 | Example 19 | Example 20 | Example 21 | Example 22 |
|---|---|---|---|---|---|
| Composition [%] | | | | | |
| Total solid content | 34.96 | 35.26 | 32.26 | 30.26 | 28.26 |
| Milk fat content | 10.00 | 10.00 | 8.00 | 5.00 | 3.00 |
| Nonfat milk solid content | 8.00 | 8.00 | 8.00 | 8.00 | 8.00 |
| Yolk fat content | 0.40 | 0.40 | 0.40 | 0.40 | 0.40 |
| Proportion of fine-cellulose-containing complex F [wt %] | — | 0.30 | 0.30 | 0.30 | 0.30 |
| Results of evaluation of lactic ice | | | | | |
| Homogenization | Pressure variation range of ±0.5 MPa | Pressure variation range of ±0.5 Mpa | Pressure variation range of ±0.5 Mpa | Pressure variation range of ±0.5 Mpa | Pressure variation range of ±0.5 MPa |
| Texture/feel of body | — | Superior to Comparative Example 19 | Superior to Comparative Example 19 | Equal to Comparative Example 19 | Inferior to Comparative Example 19 |
| Texture/solubility in the mouth | Good | Good | Good | Good | Good |
| Texture/rough feel | None | None | None | None | None |

TABLE 7

| Results of evaluation of dressings containing a fine-cellulose-containing complex | Example | | | | | | |
|---|---|---|---|---|---|---|---|
| | 23 | 24 | 25 | 26 | 27 | 28 | 29 |
| Fine-cellulose-containing complex | A | B | C | D | E | F | G |
| Results of evaluation of half-type mayonnaise-like dressing | | | | | | | |
| Viscosity [Pa · s] | 2.5 | 3.2 | 2.7 | 3.8 | 4.2 | 3.0 | 3.0 |
| Texture/feel of body | b | a | a | a | a | a | a |
| Texture/solubility in the mouth | a | a | a | a | b | a | a |
| Texture/rough feel | a | a | a | a | a | a | a |
| Texture/unity of taste | a | a | a | a | a | a | a |

TABLE 8

| Results of evaluation of lactic ices containing a fine-cellulose-containing complex | Comparative Example | | | | | | | |
|---|---|---|---|---|---|---|---|---|
| | 20 | 21 | 22 | 23 | 24 | 25 | 26 | 27 |
| Fine-cellulose-containing complex | H | I | J | K | L | M | N | O |
| Proportion of xanthan gum in dressing [%] | 0.35 | 0.5 | 0.6 | 0.3 | 0.4 | 0.4 | 0.4 | 0 |
| Results of evaluation of half-type mayonnaise-like dressing | | | | | | | | |
| Viscosity [Pa · s] | 2.9 | 3.3 | 2.5 | 3.8 | 4.1 | 3.0 | 3.1 | 3.3 |
| Texture/feel of body | a | a | b | a | a | b | a | b |
| Texture/solubility in the mouth | b | c | a | d | b | a | b | d |
| Taste/rough feel | a | b | b | a | b | b | b | a |
| Texture/unity of taste | b | c | a | b | b | c | b | c |

INDUSTRIAL APPLICABILTY

Foods containing the fine-cellulose-containing complex of the present invention have a high quality. When the foods are ice cream type articles, they can be obtained as articles which have a high solubility in the mouth and no rough feel in spite of their feel of body. they are excellent also in stability over a long period of time and have heat shock resistance. Moreover, stable production of a homogeneous liquid raw material for the ice cream type articles becomes possible. Furthermore, when the foods are low-fat foods, they can be obtained as foods that have good substance and a high solubility in the mouth though the amount of fat and oil incorporated into them is small.

The invention claimed is:

1. A cellulose-containing complex comprising 60 to 80 wt % of cellulose having 30 to 375 of an average polymerization degree, 2 to 12 wt % of locust bean gum, 0.5 to 8 wt % of xanthan gum and 0.5 to 37.5 wt % of a hydrophilic material(s) obtained by subjecting a mixture of 60 to 80 wt % of the cellulose, 2 to 12 wt % of the locust bean gum, 0.5 to 8 wt % of the xanthan gum and 0.5 to 37.5 wt % of the hydrophilic material(s) to wet co-grinding treatment in the presence of 20 to 60 wt % of water, and then drying to form a powder, wherein said complex has a property (A) wherein when said complex has been dispersed in water at 8000 rpm for 5 minutes with a homomixer at 85° C., said complex forms particles having an average particle size of 60 μm or less, the proportion of particles with a particle size of 100 μm or more among the formed particles is 30 vol % or less based on the total volume of the formed particles, and wherein said complex has a property (B) wherein when said complex has been dispersed in a 1% aqueous suspension at 25° C. and 15000 rpm for 2 minutes in a homogenizer, the dispersed complex has a colloid fraction of 30% or less.

2. A cellulose-containing complex according to claim 1, wherein the average particle size of particles formed by dispersing the complex in water at 8000 rpm for 5 minutes with a homomixer at 85° C. is 40 μm or less, and the proportion of particles with a particle size of 100 μm or more among the formed particles is 25 vol % or less based on the total volume of the formed particles.

3. A cellulose-containing complex according to claim 1, wherein the average particle size of particles formed by dispersing the complex in water at 8000 rpm for 5 minutes with a homomixer at 85° C. is 25 μm or less, and the proportion of particles with a particle size of 100 μm or more among the formed particles is 15 vol % or less based on the total volume of the formed particles.

4. A food composition comprising a cellulose-containing complex according to any one of claims 1 to 3 incorporated thereinto.

5. A food composition according to claim 4, which is ice cream, ice milk or lactic ice.

6. A process for producing a cellulose-containing complex according to any one of claims 1 to 3 which comprises, at least, subjecting a mixture of 60 to 80 wt % of cellulose, 2 to 12 wt % of locust bean gum, 0.5 to 8 wt % of xanthan gum and 0 to 37.5 wt % of the hydrophilic material(s) to wet co-grinding treatment in the presence of 20 to 60 wt % of water, and then drying the mixture.

7. A cellulose-containing complex according to claim 1, wherein said hydrophilic material(s) is in the cellulose-containing complex in a concentration of 0.5 to 35wt %.

8. A cellulose-containing complex according to claim 1, wherein said hydrophulic material(s) is dextrin.

9. A cellulose containing complex comprising 60 to 80 wt % of cellulose having 30 to 375 of an average polymerization degree, 2 to 12 wt % of locust bean gum, 0.5 to 8 wt % of xanthan gum and 0.5 to 37.5 wt % of a hydrophilic material(s), wherein the cellulose, the locust bean gum, the xanthan gum and the hydrophilic material(s) axe contained in each particle of the cellulose containing complex, wherein the xanthan gum and the hydrophilic material(s) are distributed throughout each particle, wherein said complex has a property (A) wherein when said complex has been dispersed in water at 8000 rpm for 5 minutes with a homomixer at 85° C. said complex forms particles having an average particle size of 60 μm or less, the proportion of particles with a particle size of 100 μm or more among the formed particles is 30 vol % or less based on the total volume of the formed particles, and wherein said complex has a property (B) wherein when said complex has been dispersed in a 1% aqueous suspension at 25° C. and 15000 rpm for 2 minutes in a homogenizer, the dispersed complex has a colloid fraction of 30% or less.

10. A cellulose-containing complex according to claim 9, wherein said hydrophilic material(s) is in the cellulose-containing complex in a concentration of 0.5 to 35 wt %.

11. A cellulose-containing complex according to claim 9, wherein said hydrophilic material(s) is dextrin.

12. A cellulose-containing complex comprising 60 to 80 wt % of cellulose having 30 to 375 of an average polymerization degree, 2 to 12 wt % of locust bean gum, 0.5 to 8 wt % of xanthan gum and 0.5 to 37.5 wt % of a hydrophilic material(s) obtained by subjecting a mixture of 60 to 80 wt % of the cellulose, 2 to 12 wt % of the locust bean gum, 0.5 to 8 wt % of the xanthan gum and 0.5 to 37.5 wt % of the hydrophilic material(s) to wet co-grinding treatment in the presence of 20 to 60 wt % of water, and then drying to form a powder, wherein said complex has a property (A) wherein when said complex has been dispersed in Dispersion Condition (A), said complex forms particles having an average particle size of 60 μm or less, the proportion of particles with a particle size of 100 μm or more among the formed particles is 30 vol % or less based on the total volume of the formed particles, and wherein said complex has a property (C) wherein when said complex has been dispersed in Dispersion Condition (B) said complex forms particles having an average particle size which is smaller than the particle size formed in Dispersion Condition (A) and ranging from 20 μm or less, wherein said Dispersion Condition (A) comprises dispersing said complex in water at 8000 rpm for 5 minutes with a homomixer at 85° C., and wherein said Dispersion Condition (B) comprises dispersing said complex in a 1% aqueous suspension at 25° C. and 15000 rpm for 2 minutes in a homogenizer.

13. A cellulose-containing complex according to claim 12, wherein said hydrophilic material(s) is in the cellulose-containing complex in a concentration of 0.5 to 35 wt %.

14. A cellulose-containing complex according to claim 12, wherein said hydrophilic material(s) is dextrin.

* * * * *